US008560548B2

(12) United States Patent
Baid et al.

(10) Patent No.: US 8,560,548 B2
(45) Date of Patent: Oct. 15, 2013

(54) SYSTEM, METHOD, AND APPARATUS FOR MULTIDIMENSIONAL EXPLORATION OF CONTENT ITEMS IN A CONTENT STORE

(75) Inventors: Akanksha Baid, Madison, WI (US); Berthold Reinwald, San Jose, CA (US); Alkis Simitsis, Santa Clara, CA (US); John Sismanis, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 12/544,090

(22) Filed: Aug. 19, 2009

(65) Prior Publication Data

US 2011/0047159 A1 Feb. 24, 2011

(51) Int. Cl.
*G06F 7/00* (2006.01)

(52) U.S. Cl.
USPC .......................................... 707/739; 706/54

(58) Field of Classification Search
USPC .......................................... 707/739; 706/54
See application file for complete search history.

(56) References Cited

U.S. PATENT DOCUMENTS

| | | | |
|---|---|---|---|
| 6,154,746 A | | 11/2000 | Berchtold et al. |
| 6,366,922 B1 * | | 4/2002 | Althoff ........................ 707/706 |
| 6,917,932 B2 | | 7/2005 | Chang et al. |
| 2006/0026152 A1 * | | 2/2006 | Zeng et al. ........................ 707/5 |
| 2008/0077570 A1 * | | 3/2008 | Tang et al. ........................ 707/5 |
| 2008/0114753 A1 * | | 5/2008 | Tal-Ezer ............................ 707/5 |
| 2009/0043785 A1 | | 2/2009 | Garward et al. |

OTHER PUBLICATIONS

Peñes et al., "Corpus-based terminology extraction applied to information access", 2001.*
Baid et al. "DBPubs: Multidimensional Exploration of Database Publications". Proceedings of the VLDB Endowment, vol. 1, Issue 2, (Aug. 2008) pp. 1456-1459.
Brauer et al. "Mapping Enterprise Entities to Text Segments". Conference on Information and Knowledge Management, (2008), pp. 85-88.
Chen et al. "A Dynamic Data Structure for Top-k Queries on Uncertain Data". Theoretical Computer Science, vol. 407, Issue 1-3, (Nov. 2008), pp. 310-317.
Li et al. "Efficient Top-k Keyword Search on XML Streams". The 9th International Conference for Young Computer Scientists, (2008), pp. 1041-1046.
Manku. "Balanced Binary Trees for ID Management and Load Balance in Distributed Hash Tables". Annual ACM Symposium on Principles of Distributed Computing, (2004), pp. 197-205.
Simitsis et al. "Multidimensional Content eXploration". Proceedings of the VLDB Endowment, vol. 1, Issue 1 (Aug. 2008), pp. 660-671.

* cited by examiner

*Primary Examiner* — Shahid Alam
*Assistant Examiner* — Dawaune Conyers
(74) *Attorney, Agent, or Firm* — Jeffrey T. Holman

(57) ABSTRACT

A computer-implemented method for accessing content items in a content store are described. In one embodiment, the computer-implemented method includes maintaining a text index of content items in a content store to enable a keyword search on the content items, receiving a query having a keyword and generating a hit list from the text index using the keyword, and extracting frequent phrases from text within content items of the hit list. The computer-implemented method also includes assigning a relative relevance to the frequent phrases and grouping content items into topics based on presence of relevant phrases within the content items of the hit list. The hit list includes one or more content items of the content store. The frequent phrases having a relatively high relevance are relevant phrases.

13 Claims, 6 Drawing Sheets

SYSTEM, METHOD, AND APPARATUS FOR MULTIDIMENSIONAL EXPLORATION OF CONTENT ITEMS IN A CONTENT STORE

BACKGROUND

Content Management (CM) and OnLine Analytical Processing (OLAP) are two separate fields in information management. Although both fields study models, concepts, and algorithms for managing large amounts of complex data, they started with very different applications as their major technology drivers. CM focuses on uniform repositories for all types of information, document/record management and archiving, collaboration, integrated middleware, etc., while OLAP is driven by financial reporting, marketing, budgeting, forecasting, and so on. Consequently, the two different fields emphasize very different aspects of information management: information capturing, storing, retention, and collaboration on the CM side, and data consistency, clear aggregation semantics, and efficiency on the OLAP side.

Various advanced applications that have recently emerged impose modern user and business needs that require the benefits of both CM and OLAP technologies. Digital libraries are becoming very rich content repositories containing documents along with metadata and/or annotations stored in semi-structured data formats. Intranet data, wikis and blogs represent examples of this trend. The above examples are just a subset of modern applications where the traditional information retrieval techniques—e.g., keyword or faceted search-are not enough, since advanced analysis and understanding of the information stored are required. On the other hand, application areas such as customer support, product and market research, or health care applications, with both structured and unstructured information, are mission-critical and require both CM and OLAP functionality, as well.

However, the synchronous application of both techniques is not straightforward. At first, the user models for CM and OLAP are dramatically different. In CM (as in information retrieval), a user is a human with cognitive capabilities. CM queries are best effort formulations of a user's information needs, and support an interactive process of data exploration, query rephrasing, and guidance towards the final query result. In OLAP, a user is more like an application programmer using an API to access the data. OLAP employs a multidimensional data model allowing for complex analytical queries that are precise and provide exact query results as fast as possible. The OLAP query result is typically a matrix or pivot table with OLAP dimensions in rows and columns, and measures in cells. In summary, CM query processing depends on ranking, while OLAP query processing is an aggregation task based on testing and grouping logical predicates.

Additionally, navigating and dynamically analyzing large amounts of content effectively is known to be a difficult problem. Keyword and semantic search help alleviate this problem to some extent by returning only the top-k relevant documents that contain the search keywords. While this maybe a satisfactory result for short hit lists and for information retrieval, it is not acceptable when thousands of documents qualify for the search keywords and the user is interested in all of them, i.e., ranking is not effective. The user wants to understand the entire hit list, look at the result from many different angles and different levels of detail. Traditional OLAP techniques seem to be a desideratum to such a problem, since they have been known to be effective in analyzing and navigating through large amounts of structured data. Unfortunately, unstructured data does not lend itself well to traditional OLAP style analysis.

SUMMARY

Embodiments of a computer-implemented method for accessing content items in a content store are described. In one embodiment, the computer-implemented method includes maintaining a text index of content items in a content store to enable a keyword search on the content items, receiving a query having a keyword and generating a hit list from the text index using the keyword, and extracting frequent phrases from text within content items of the hit list. The computer-implemented method also includes assigning a relative relevance to the frequent phrases and grouping content items into topics based on presence of relevant phrases within the content items of the hit list. The hit list includes one or more content items of the content store. The frequent phrases having a relatively high relevance are relevant phrases. Other embodiments of the computer-implemented method are also described.

Embodiments of a computer program product for finding top-k sets in a collection of static sets P, wherein the top-k sets have maximal overlap with an input dynamic set H are described. The computer program product includes a computer useable storage medium to store a computer readable program that, when executed on a computer, causes the computer to perform operations, including randomizing items L in each static set P[i] in a collection of static sets P, randomizing an input dynamic set H, estimating an intersection size of an intersection of the static set P[i] and the input dynamic set H for each static set P[i], and maintaining a priority queue of top-k static sets having largest intersection sizes. Items L are randomized during a preprocessing state independent of the input dynamic set H. Randomizing items L and input dynamic set H uses a technique including hashing each item L[i] into a random number in a [0,1] domain to obtain hashed values and sorting the hashed values in increasing order. Dynamic set H is randomized at query time. Other embodiments of the computer program product method are also described.

Embodiments of a system are also described. In one embodiment, the system includes a content management system (CMS), an exploration server, and a multidimensional schema manager. The CMS includes a plurality of content items, a content store to store content items, and a text index of text within the content items. The exploration server is coupled to the content store and configured to generate a hit list from the text index using the keyword, extract frequent phrases from text within content items of the hit list, assign a relative relevance to the frequent phrases, and group content items into topics. The hit list includes one or more content items of the content store. Frequent phrases having a relatively high relevance are relevant phrases. Content items are grouped into topics based on presence of relevant phrases within the content items of the hit list. The multidimensional schema manager manages a multidimensional schema. The multidimensional schema includes a schema of a fact table and schemata of static dimensions. Dynamic dimensions of the multidimensional schema are identified in response to the exploration server returning the hit list based upon content dynamically extracted from the subset of content items identified in the hit list. Other embodiments of the system are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
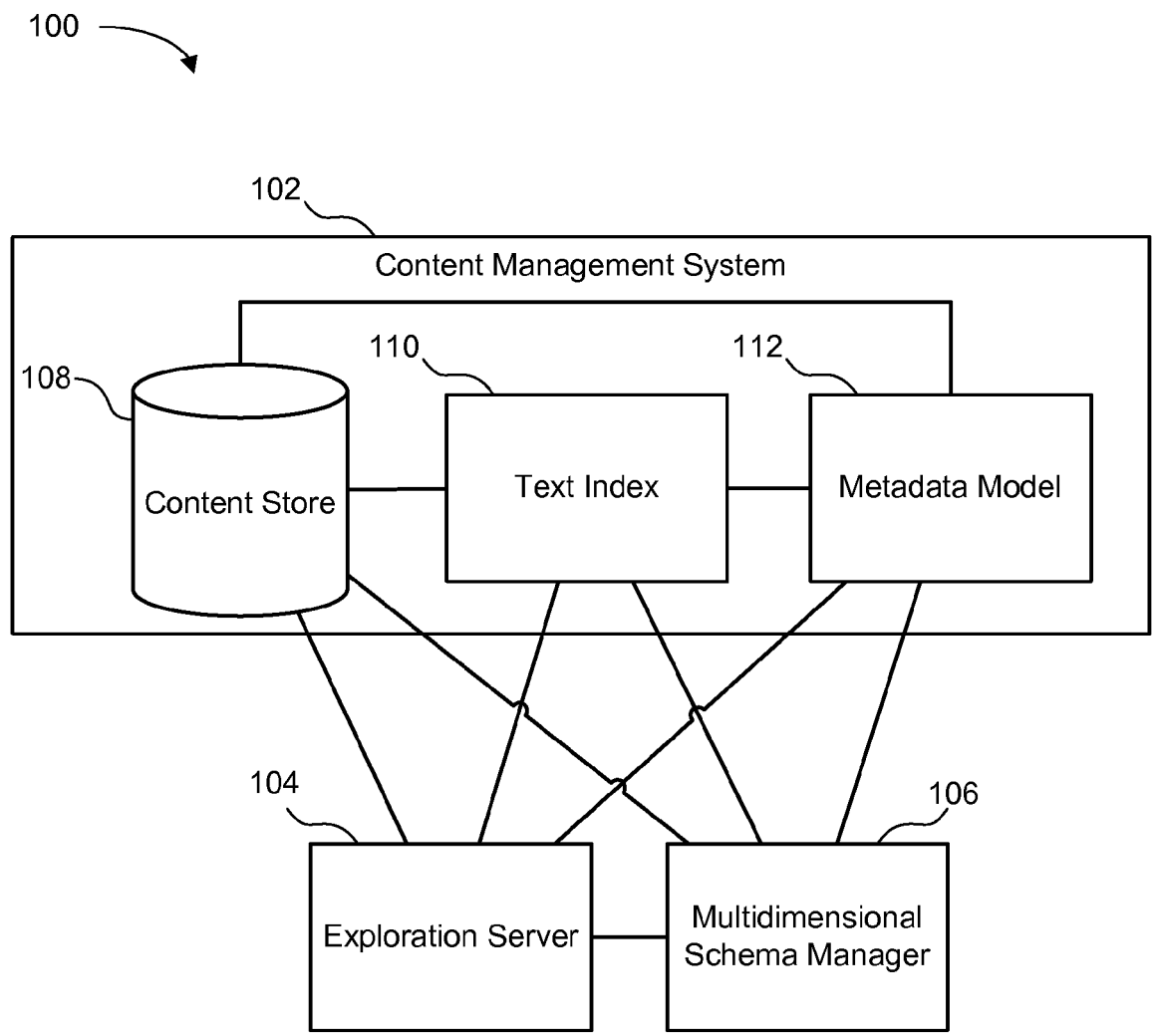
FIG. 1 depicts a schematic diagram of one embodiment of a system for exploring content in a content repository.

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Embodiments of a system, method, and apparatus for multidimensional content exploration are described. Keyword driven OLAP over both structured and unstructured content to populate static as well as dynamic dimensions allows for roll-up and drill-down operations based on the content and the link-structure of a dynamically selected content item subset. Analyzing text content and extracting properties of such dynamic subsets is a challenging problem. Even more so, since in multidimensional content exploration the system has only a few seconds to perform the text analysis and the corresponding OLAP aggregation. Although there is a plethora of work in analyzing text, most of it is not applicable under the time constraints required for acceptable performance in a dynamic content search. For that reason, frequent phrases are extracted from content items in a content repository. The method scales extremely well with regard to the size of the selected subsets (hit list.) It is designed so that, as the hit list size increases, the performance of the system increases. Such frequent phrases are used as a foundation for more elaborate content-based extraction. Frequent phrases are further filtered and refined by techniques such as relevance boosting and latent-semantic indexing to group content items with similar text together and even extract representative group descriptions.

Finally embodiments of the system incorporate the link-structure among the content items to extract elaborate measures, such as content item centrality/importance over the dynamically selected subset in order to provide interesting reports to the user.

As a motivating example, assume that a user is interested in finding out the various research topics that have been investigated in the XML domain in the past years, locating each area's seminal papers, and finding out the corresponding influential authors. Regular keyword search using a text index could be used to retrieve all publications containing the keyword 'XML' in the text or metadata. However, the query result comprises thousands of papers and would require extensive browsing and paper reading in order to get a grip on the subject area. Embodiments of the system, method, and apparatus contribute towards facilitating such procedure. Some embodiments use the navigational and analytical power of OLAP in synergy with text analysis. Static dimensions like location, time, and venues are combined with dynamic dimensions based on the publication content like frequent and relevant phrases, topics, and so on. For the latter, the system analyzes publications in the query result. It efficiently extracts the frequent phrases, it boosts the most relevant phrases (i.e., frequent phrases that appear proportionally much more often in the result than the full corpus, like 'XQuery'), it groups content items with similar relevant phrases together and it dynamically identifies meaningful group descriptions; e.g., 'Schema Mapping' and 'XPath'. Furthermore, one embodiment of the system exploits citations as a link structure to rank publications and extract publication importance, and then, by leveraging the aggregation power of OLAP, shows, for example, the maximum importance per topic in the course of time and compared against the total number of papers and citations. Hence, the dynamic analysis of the query result combined with an OLAP model provides the user with the necessary analytical means to slice and dice the dataspace, and discover and understand important trends.

Embodiments of the system, method, and apparatus include an extensible framework that allows the non-technical user to get insight (reports, forecasts, trend analysis) by combining content-based, structure-based and link-based explorations of large amounts of content repositories. In one embodiment, the method is a method for mapping metadata to a structure-based multidimensional schema, and, most importantly, for presenting means for enriching such schema at query time with content-based dimensions based on properties of dynamically selected subsets and measures based on a link structure of the subsets. The method, in some embodiments, includes computing a core content-based property, frequent phrases, on dynamically selected subsets.

FIG. 1 depicts a schematic diagram of one embodiment of a system 100 for exploring content in a content repository. The system 100 includes a content management system (CMS) 102, an exploration server 104, and a multidimensional schema manager 106. The system 100 responds to a query input and generates an output including references to content items managed by the CMS 102 arranged in topic groups based on static and dynamic dimensions.

The CMS 102, in some embodiments, stores content items in a content store 108. The content items may be any type of content item. For example, the content items may include scholarly publications, documents, patents, books, articles, other types of content items, or a combination of types of content items. The content store 108 may be any type of device capable of storing the content items. For example, the content store 108 may be a database system including a hard drive for storing content items.

In one embodiment, the content store 108 is an element of a single computer system that operates the CMS 102. In an alternative embodiment, the content store 108 is separate from one or more other elements of the CMS 102. For example, the content store 108 may be storage device in communication with other elements of the CMS 102 via a network connection (not shown).

The CMS 102, in some embodiments, maintains a metadata model 112 for metadata associated with the content items in the content store 108. The metadata includes links between the content items in certain embodiments. The metadata can be either simple attributes such as content item timestamps, authors, title, and so on, or more sophisticated attributes extracted from the content items, such as vehicle type in a car insurance policy or a link to the insurance agent who sold the insurance policy.

In one embodiment, the CMS 102 maintains an enriched text index 110 that allows for keyword search on both the content items and the metadata. The text index 110 includes an index indicating the presence and frequency of text in the content items in some embodiments. The text index 110 indexes single words. In another embodiment, the text index 110 indexes phrases consisting of more than one word.

The multidimensional (MD) schema manager 106, in one embodiment, manages an MD schema. For obtaining OLAP style functionality, the MD schema is created by using information from the content items in the content store 108 and metadata of the content items stored in the content store 108. In one embodiment, the MD schema manager 106 operates on a computer separate from the exploration server 104. In an alternative embodiment, the MD schema manager 106 operates on the same computer system as the exploration server 104. In yet another embodiment, the MD schema manager 106 is a component of the exploration server 104.

Creation of the MD schema generates some modeling and operational challenges. The system 100, in one embodiment, creates an MD schema by interpreting the individual concepts of the CMS 102 (i.e., content item, content, metadata, and links) as multidimensional entities (i.e., facts, dimensions, and measures) of this MD. In some embodiments, the mapping is complete-missing elements are not allowed—and correct—the aggregation results in the MD are correct throughout the navigation into the schema. In doing so, there are several challenges, such as the cases of multi-valued attributes and multi-cubes. The mapping from CMS 102 to MD is formally presented in relation to FIG. 3.

The exploration server 104, in one embodiment, accesses the MD, the text index 110, the content store 108, and the metadata model 112 to explore the content items. The exploration server 104 is described in greater detail in relation to FIG. 2.

Figure 2:
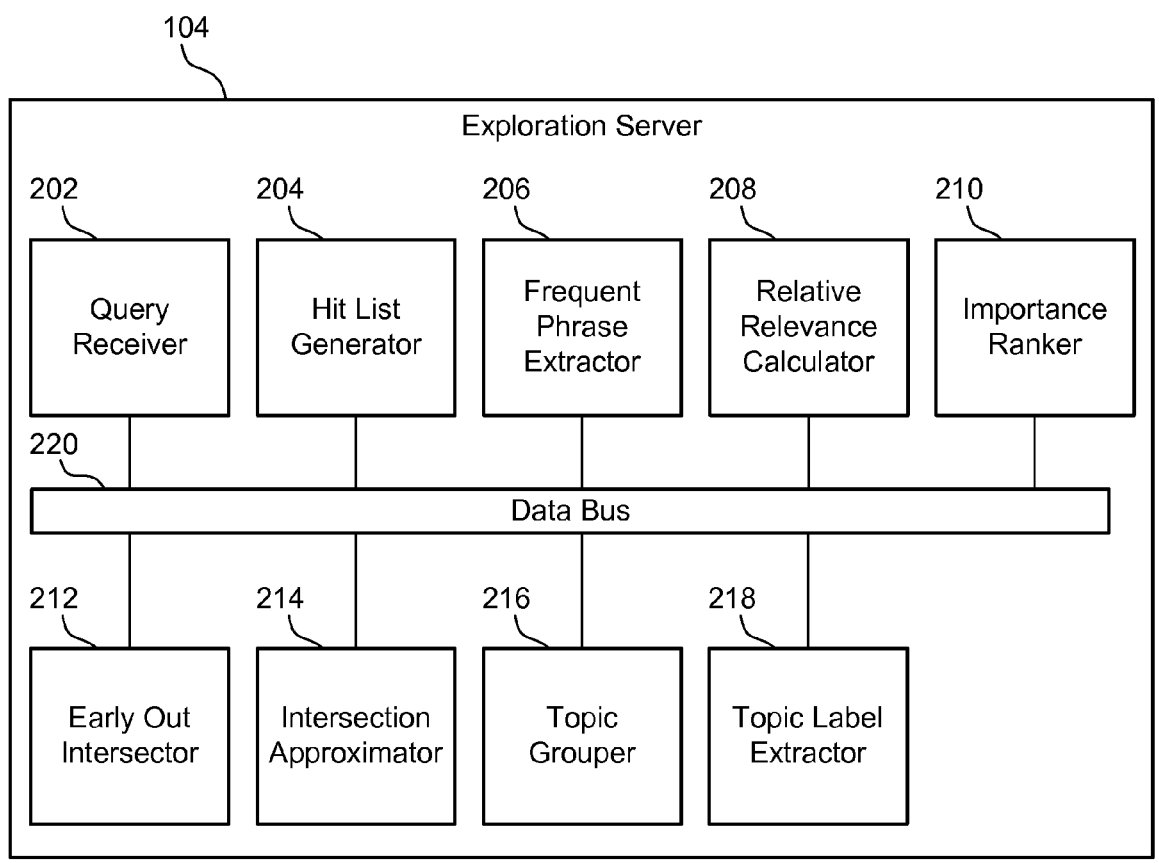
FIG. 2 depicts a schematic diagram of one embodiment of the exploration server of FIG. 1.

FIG. 2 depicts a schematic diagram of one embodiment of the exploration server 104 of FIG. 1. The exploration server 104 includes a query receiver 202, a hit list generator 204, a frequent phrase extractor 206, a relative relevance calculator 208, an importance ranker 210, an early out intersector 212, an intersection approximator 214, a topic grouper 216, a topic label extractor 218, and a data bus 220. The exploration server 104 accesses the MD, the text index 110, the content store 108, and the metadata model 112 to explore the content items.

A user approaches the system 100 by submitting a keyword query to the exploration server 104, in one embodiment. The query is received by the query receiver 202. The query language used by the exploration server 104 is generic enough and supports usual operators (AND, OR, NOT, and so on) used in modern textual indices. In certain embodiments, the exploration server 104 supports any form of querying such as NLP, taxonomy search, semantic search, and so forth.

In one embodiment, the query is received by the query receiver 202 from a remote computer (not shown). For example, the query may be submitted by a user on a computer connected to the exploration server 104 via a network (not shown), such as the Internet. In another embodiment, the query is received from a user directly by the query receiver 202.

Query processing by the exploration server 104, in one embodiment, consists of a sequence of operations executed each time a query is issued. First, the hit list generator 204 probes the text index 110 on the content items in the CMS 102 with the query keywords to generate a potentially large hit list. Then, the MD schema manager 106 populates the MD. The metadata of the content items in the hit list are used for populating the static dimensions, i.e., the dimensions that can be created a priori having only the knowledge emanated from the CMS metadata. Analyzing the content of the content items in the hit list yields dynamic dimensions in the MD, e.g., dimensions based on the topics of the content items, the frequent or relevant phrases, and so on.

A core property of dynamically selected content items is the frequent phrases in this subset. Such frequent phrases form the foundation for much more elaborate property extraction. The frequent phrase extractor 206 extracts phrases that appear frequently in the content items referenced by the hit list. The relative relevance calculator 208, in one embodiment, determines a relevance of the frequent phrases relative to one another. Phrases having a relatively high relevance are referred to as "relevant phrases."

In some embodiments, the importance ranker 210 ranks the content items. Different kinds of ranking techniques may be implemented by the importance ranker 210, either for example, based on the link structure between content items or relevance from a text index 110. Ranks are used as measures in MD, but also for dealing with scalability issues in discovering dimensions. Such ranks allow for a focus on the important content and deal with noisy content otherwise.

The early out intersector 212, in one embodiment, speeds the determination of frequent phrases by the frequent phrase extractor 206. The early out intersector 212 prunes intersection of posting lists by sorting the posting lists by descending length and ceasing intersection in response to the length of a posting list being below a threshold length. Early out intersection is described in greater detail below.

In one embodiment, the intersection approximator 214 speeds the determination of frequent phrases by the frequent phrase extractor 206. The intersection approximator 214 prunes intersection of posting lists by performing a relatively small and bounded number of intersections. Approximate intersection is described in greater detail below.

The topic grouper 216, in one embodiment, uses static and dynamic dimensions to group content items into one or more topic groups. The topic grouper 216 uses relevant phrases determined for content items by the relative relevance calculator 208 to determine topic groups for content items. In some embodiments, a content item may be included in a plurality of topic groups by the topic grouper 216.

In certain embodiments, the topic label extractor 218 determines a topic label for a topic group 218. The topic label determined by the topic label extractor 218 is used to identify the topic associated with a topic group. For example, the topic label may be displayed in a GUI (not shown) presented to a user.

The data bus 220 provides a communication pathway within the exploration server 104 for various elements of the exploration server 104. The data bus 220 may be any type of data communication system, including, but not limited to, a hardware bus, a wired connection, a network, a mesh system, and a wireless communication system. In some embodiments, the data bus 220 may include a combination of types of data communication system In certain embodiments, the exploration server 104 performs extraction in only a few seconds and scales extremely well with regard to the size of the selected subset and performs faster as the selected subset size increases. The system 100 uses frequent phrases to group content items with similar text together and provides meaningful group descriptions by applying techniques such as relevance boosting and latent-semantic-indexing.

The exploration server 104, in one embodiment, responds to a keyword query by organizing content items in the CMS 102 and generating an MD. The exploration server 104 enables OLAP-style navigation and allows for use of OLAP tools for interactive reporting. Analytical reports built on dynamic dimensions—including dimensions other than those described above-highlight interesting observations for helping users better understand the entire query result, before starting the navigation.

Figure 3:
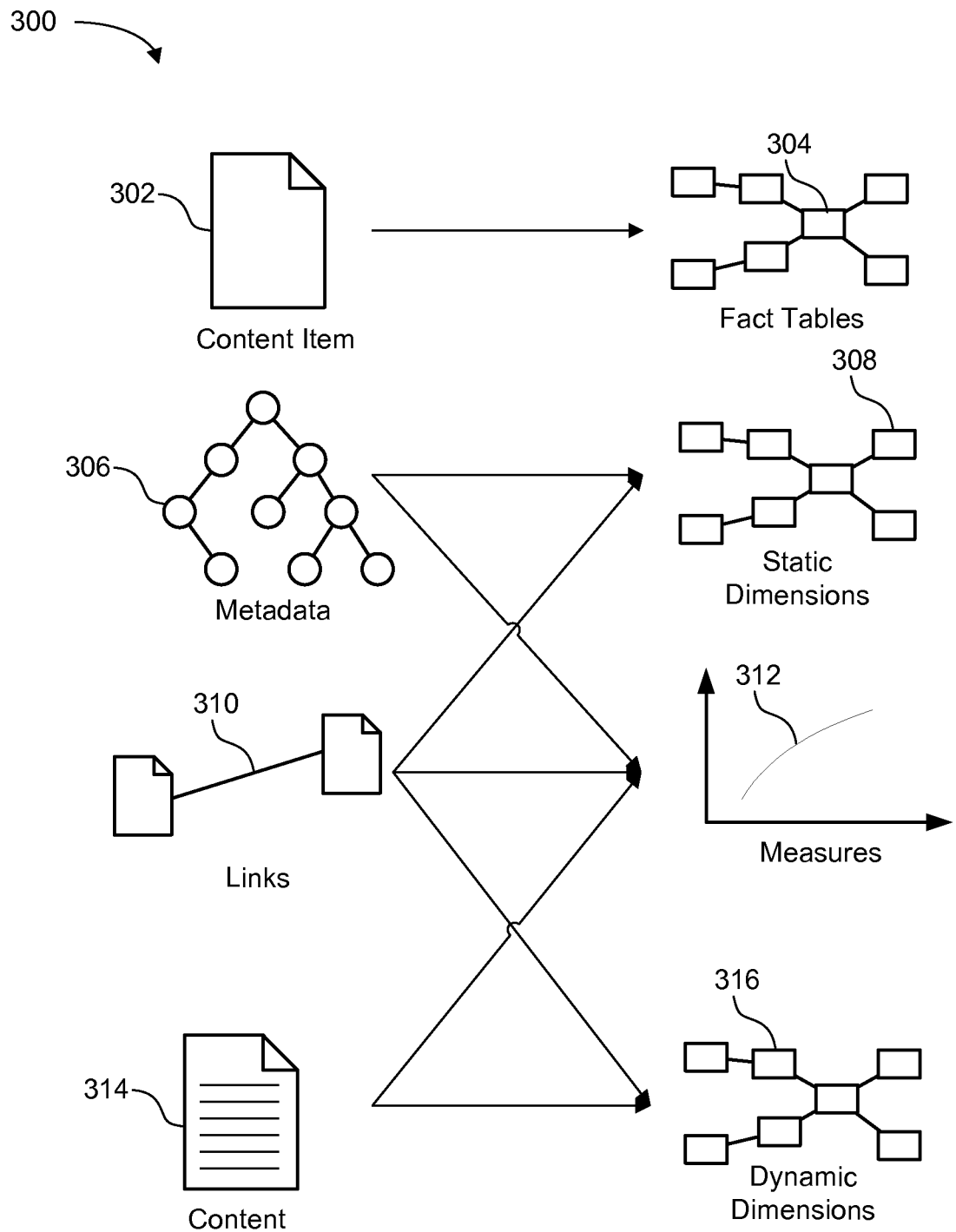
FIG. 3 depicts a schematic diagram of another embodiment of a method for mapping CM concepts to MD.

FIG. 3 depicts a schematic diagram of one embodiment of a method 300 for mapping CM concepts to MD. In the method 300, information from a content item 302 is mapped to a fact table 304. Information from metadata 306 in a CMS 102 is mapped to static dimensions 308 and measures 312. Information from links 310 between content items 302 in a content store 108 is mapped to static dimensions 308, measures 312, and dynamic dimensions 316. Information from the content of content items 302 is mapped to measures 312 and dynamic dimensions 316.

An embodiment of the method 300 for mapping CM concepts to MD includes a finite set containing n members is denoted as $\Xi=\{\xi_i\}=\{\xi_1, \ldots, \xi_n\}$, where $\xi_i$ is the ith member, $i \in [1, n]$, and its cardinality as $|\Xi|=n$. A total strict order and a partial order is denoted on a set $\{\xi_i\}$ as $<\{\xi_i\}>$ and $\leq\{\xi_i\}\geq$, respectively. In both cases, the order is considered from the left (min) to the right (max); i.e., $<\{\xi_i, \xi_i\}> \Rightarrow \xi_i < \xi_i$, and $\leq\{\xi_i, \xi_i\}\geq \Rightarrow \xi_i \leq \xi_i$.

In some embodiments of the method 300, a CMS 102 includes different types of content items 302—e.g., text documents, web pages, e-mails, and so on-along with their respective sets of metadata 306. Content items 302 of the same type share the same set of metadata, while usually different sets of metadata 306 correspond to multiple types of content items 302. Each content item type consists of metadata 306 and content 314. The latter contains a set of terms and phrases, which are, potentially, overlapping sequences of consecutive terms. Content items 302 may connect with each other through links 310 that signify a semantic relationship between the content items 302. Formally, a CMS 102 is denoted as a set $S_{CM}=<\{D^T\}>$ of content item types $D^T$. Each content item 302 $d_i$ is an instance of a content item type, includes metadata 306, links 310, and content 314, and is defined as $d_i=<M_{d_i}, L_{d_i}, C_{d_i}>$. The metadata 306 of a content item 302 follow a structured schema of attributes, both single-valued, a=<name, val> and multi-valued attributes, a*=<name, {val}>, and they are defined as $M_{d_i}=<\{a\}, \{a^*\}>$. The links of a content item 302 are incoming, $L^-$, and outgoing, $L^+$, thus: $L_{d_i}=<L^-, L^+>$. The content 314 of a content item 302 includes a total ordered set of the terms in the content item 302: $c_{d_i}=<\{t_i\}>$. The content 314 of content item type is defined as the content 314 of all the content items 302 of that type, i.e., $C=\{c_{d_i}\}$.

A multidimensional schema (MD), in some embodiments of the method 300, includes a set of factual schemata 304, i.e., $S_{MD}=<\{F_i\}>$. A factual schema 304 or simply, fact, $F_i$, includes a set of dimensional schemata 308, 316 and a set of measures 312: $F_i=<\{D_j^{F_i}\}, \{\mu^{F_i}\}>F_i$. A dimensional schema or simply, dimension, $D_j$, is defined as a total ordered set containing a name and a poset of levels, i.e., $D_j=<$name, $\leq\{l_i\}\geq>$. The dimensions 308, 316 are orthogonal to each other or equally, there are no functional dependencies among attributes from distinct dimension schemata. A level is defined as a total ordered set of a name and an attribute, i.e. $l_k=<$name, a$>$. The levels in a dimension 308, 316 are functionally dependent on each other. A measure 312 $\mu$ is an instance of an attribute, which contains values of a numeric data type. The measures 312 are functionally determined by the levels occurring in the dimension schemata. Also, the measures 312 can be computed from each other and they are useful as they allow performing roll-ups and drill-downs beyond the hierarchies.

In one embodiment, a CMS 102, $S_{CM}$ is mapped to a multidimensional schema 308, 316, $S_{MD}$, i.e., $M:S_{CM} \rightarrow S_{MD}$. For each content item type $D_i^T \in D^T$ of $S_{CM}$, a factual schema $F_i$ is created in the multidimensional schema $S_{MD}$ through the mapping $M_{D_i^T 43 F_i}$ that satisfies the following two properties: (a) completeness with regard to coverage, and (b) correctness.

Completeness with regard to coverage ensures that all elements of the CMS 102, and therefore, all the information stored in it, are represented in the multidimensional schema. Each content item $d_i$ of a certain content item type $D_i^T$, its corresponding metadata 306 $M_{d_i}$, links 310 $L_{d_i}$, and content 314 $C_{d_i}$ is mapped to the factual schema $F_i$, namely the dimensions 308, 316 $D_j^{F_i}$ and the measures 312 $\mu^{F_i}$. FIG. 3 pictorially depicts the aforementioned mappings. Formally, the satisfaction of the first property is ensured, in one embodiment, by the following definition:

The mapping $M_{D_i^T \rightarrow F_i}$ is complete with regard to coverage if and only if each element of a content item type $d_i=<M_{d_i}, L_{d_i}, C_{d_i}>$ belongings to a content item type $D_i^T$ mapped to a fact $F_i=<\{D_j^{F_i}\}, \{\mu^{F_i}\}>$ through the following mappings:

mapping of $d_i$ to the dimensions 308, 316 (mapping function f): $f_M: M_{d_i} \rightarrow D_j^{F_i}, f_L: L_{d_i} \rightarrow D_j^{F_i}, f_C: C_{d_i} \rightarrow D_j^{F_i}$.

mapping of $d_i$ to the measures 312 (mapping function g): $g_M: M_{d_i} \rightarrow \mu^{F_i}, g_L: L_{d_i} \rightarrow \mu^{F_i}, g_C: C_{d_i} \rightarrow \mu^{F_i}$.

A concrete definition of the mapping functions f and g heavily depends on the application considered each time. However, a set of generic properties characterize both functions.

Correctness, in one embodiment, requires that the aggregates in the MD should be correct whatever slice of the MD is used to produce them. Traditionally, the multidimensional design deals with single-valued attributes, for which—and for the respective levels and dimensions as well—the correctness is ensured by a summarizability condition. However, this does not hold for multi-valued attributes, as is discussed below.

In some embodiments, summarizability refers to whether a simple aggregate query correctly computes a single-category dimension instance from another precomputed single-category dimension instance in a particular database instance. In one embodiment, the satisfaction of summarizability is ensured by defining the mapping $M_{D_i^T \rightarrow F_i}$ as summarizible if and only if the following conditions are satisfied: (a) disjointness of levels and dimensions, (b) completeness of the information stored in the dimensions, i.e., all instances exist in each level and are assigned to an instance of an upper level, and (c) type compatibility.

Completeness, in one embodiment, is enforced during the population of the multidimensional schema. Compatibility, in certain embodiments, is taken into consideration during the selection of the measures 312, that is, it is considered as a condition in the application of the function g.

Traditionally, disjointness of levels and dimensions have been treated as an implicit restriction of dimension models: the mappings between members of two levels are many-to-one relations. This approach can be problematic, particularly in the presence of multi-valued attributes, as they introduce many-to-many relationships between two levels of a dimension or across dimensions. Relational-based DW and OLAP systems avoid such many-to-many relationships, because they complicate the semantics of the returned aggregates due to double counting and overlapping problems.

In some embodiments, a dimension 308, 316 that has levels containing multi-valued attributes a* is called a multi-valued dimension and is denoted as $D^*_j$. Similarly, those levels are called multi-valued levels and are denoted as $1^*_j$.

Consider the xml snippet of Table 1, below which describes two documents: $\{d_1, d_2\}$, of the same type, which have been published in the venue $v_1$ and have three citations each. Also, the first document has two authors: $\{a_1, a_2\}$, while the second has only one author: $\{a_1\}$. Thus, there is a many-to-many relationship between titles and authors.

TABLE 1

| XML Snippet |
|---|
| <doc> |
|    <venue>v1</venue> |
|    <title>t1</title> |
|    <author>a1</author> |
|    <author>a2</author> |
|    <citations>3</citations> |
| </doc> |
| <doc> |
|    <venue>v1</venue> |
|    <title>t2</title> |
|    <author>a1</author> |
|    <citations>3</citations> |
| </doc> |

The unique document type should be mapped to a fact F. However, for the design of the dimensions there are four different candidate design choices as described by the four cases below.

Case I: Expand the width of the fact table. Create card(l*) attributes in the fact table F, each one corresponding (through a FK relationship) to a different dimension. This solution is clearly infeasible in the presence of a reasonably high number of unique values in that level or even worse, in the general case, where the content of D* is dynamically evolving in time. For the example of Table 1, this case practically signifies the creation of one dimension per different author (see Table 2, below).

TABLE 2

| Expanded Width Fact Table | | | | |
|---|---|---|---|---|
| v | t | a1 | a2 | cts |
| v1 | t1 | 1 | 1 | 3 |
| v1 | t2 | 1 | — | 3 |

Case II: Expand the height of the fact table. Essentially, each F-tuple expands to the number of D* tuples that it can join with. This case is pictorially depicted in Table 3.

TABLE 3

| Expanded Height Fact Table | | | |
|---|---|---|---|
| v | t | a | cts |
| v1 | t1 | 1 | 3 |
| v1 | t1 | 2 | 3 |
| v1 | t2 | 1 | 3 |

Case III: Treat corresponding D*-tuples as a set inside F. In this case, each F-tuple corresponds to exactly one D*-tuple, but in this case the multi-valued attribute is of type 'set' (see Table 4, below).

TABLE 4

| Treat Tuples as Sets inside F | | | |
|---|---|---|---|
| v | t | a | cts |
| v1 | t1 | {a1, a2} | 3 |
| v1 | t2 | {a1} | 3 |

Case IV: Use a bridge table between F and D*. Finally, another case is to use a bridge table for relaxing the many-to-many relationship. In this case, a bridge table intervenes between the involved entities, containing one tuple per each unique pair of values from both entities (see Table 5, below).

TABLE 5

| Bridge Table | | | | | |
|---|---|---|---|---|---|
| v | t | cts | t | aid | aid | a |
| v1 | t1 | 3 | t1 | 1 | 1 | a1 |
| v1 | t2 | 3 | t1 | 2 | 2 | a2 |
|  |  |  | t2 | 1 |  |  |

Given that the method of Case I cannot scale up in the general case, the other three cases are examined with regard to the correctness of the aggregated results. To facilitate the discussion, example aggregate queries are presented in Table 6, below.

TABLE 6

| Example Queries | | | | |
|---|---|---|---|---|
|  | Case I | Case II | Case III | Case IV |
| Q1 | 6, 3 | 6, 3 | 6, 3 | 6, 3 (a1, a2) |
| Q2 | 3, 3 | 6, 3 | 3, 3 | 3, 3 |
| Q3 | 6 | 9 | 6 | 6 |

Q1: Sum (Citations) group by author
Q2: Sum (Citations) group by title
Q3: Sum (Citations) group by venue The method of Case II produces correct results for the multi-valued level, i.e., authors. Still, due to the violation of the summarizability condition—the property disjointness of levels does not hold—the aggregated results for the upper levels are not correct (see Table 6).

The methods of Case III and Case IV produce correct results. Case III solves the disjointness problems among the levels with the use of a set. The aggregated results for the single-valued levels are obviously correct, while the aggregation for the multi-valued level can be realized at query-time by the appropriate expansion of the sets. (Modern DBMS's support table functions, e.g., XMLTABLE, which return a table from the evaluation of XQuery expressions; after the expansion, the groupings are realized as usual.) In Case IV, the use of a bridge table converts the many-to-many relationship between a single-valued and a multi-valued level, e.g., titles and authors, into a many-to-one relationship; in the example of Table 5, between the bridge table and the authors table a many-to-one relationship exists. In one embodiment, the approach of Case IV is followed to leverage the performance benefits of bridge tables for the amount of data used in a large CMS 102.

Figure 4A:
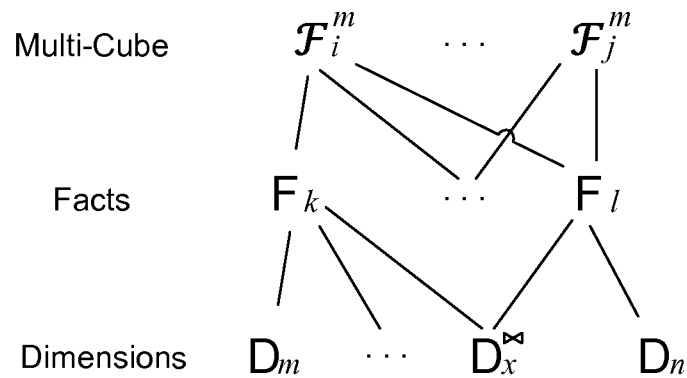
FIGS. 4a and 4b depict schematic diagrams of embodiments of multi-cubes for mapping factual schemata.
Figure 4B:
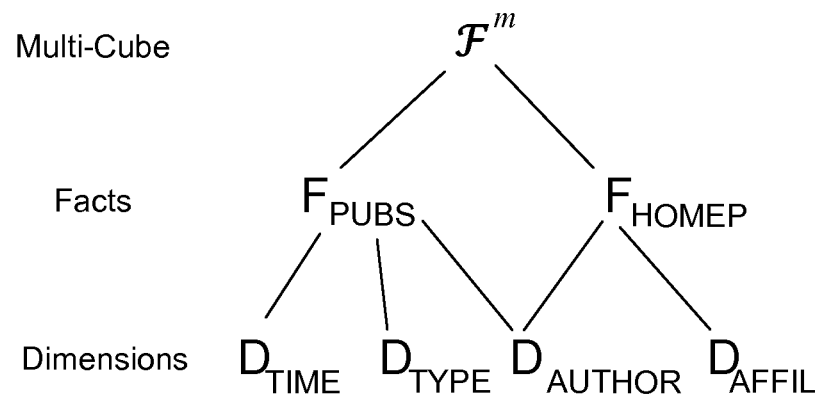

FIGS. 4a and 4b depict schematic diagrams of embodiments of multi-cubes 400, 402 for mapping factual schemata. FIG. 4a depicts a generic multi-cube 400. FIG. 4b depicts an example multi-cube 402. In some embodiments, each content item type is mapped to a factual schema. At a later stage, the final multidimensional schema corresponding to the CMS 102 may contain more than one factual schema. The modeling framework scales up to the calculation of aggregates through different content item types represented as different facts. For example, assume that the CMS 102 contains two different content item types representing publications and web homepages of the authors, respectively. Two facts would exist in the multidimensional schema: $F_{PUBS}$ and $F_{HOMEP}$. The two schemas may share a number of common dimensions; e.g., authors, $D_{AUTHOR}$ (see FIG. 4b).

In order to create calculated measures on top of those facts and/or to answer queries by combining information from more than one fact, in some embodiments, a virtual fact is defined on top of the existing facts based on the dimensions they share. Assume the existence of k factual schemata $F_i = <\{D_j^{F_i}\}, \{\mu^{F_i}\}>$, $\in[1, k]$ that share l dimensions. These dimensions are called join dimensions and are represented as $D_j^*$, $j \in [1, l]$. A multi-cube $F^m < \{D_j^{F^m}\}, \{\mu^{F^m}\} >$, is defined on top of the k facts as a view that joins the k facts on their join dimensions s.t. $\{D_j^{F^m}\} = \leq \{D_j^{F^k}\}, \ldots, \{D_j^{F^k}\} \geq$ and $\{\mu^{F^m}\} = <\{\mu^{F^1}\}, \ldots, \{\mu^{F^k}\}, \{\mu^{new}\}>$, where $\mu^{new}$ is a measure calculated from a combination of measures from the k facts included in the multi-cube.

Notice that, in the illustrated embodiment, a certain record in an instance of a multi-cube may contain values other than 'null' only in the join dimensions. During the navigation of a multi-cube, other dimensions beyond the join dimensions can be used as well. However, in each navigation, in the illustrated embodiment, only the join dimensions and the dimensions of one fact can be used synchronously. In the example of FIG. 4b, navigation through the $F_{HOMEP}$ may result in accessing values from measures defined on (a) the dimension $D_{AFFIL}$, e.g., the number of affiliations related with a certain homepage, and (b) the $F_{PUBS}$ through the join dimension $D_{AUTHORS}$, e.g., the number of papers (co-)authored by the author having that homepage. However, in the example of FIG. 4b, values with regard to $D_{TIME}$, e.g., the number of papers broken-down by year, are unavailable through the join dimension $D_{AUTHORS}$. In the latter case, null values are returned instead.

Figure 5:
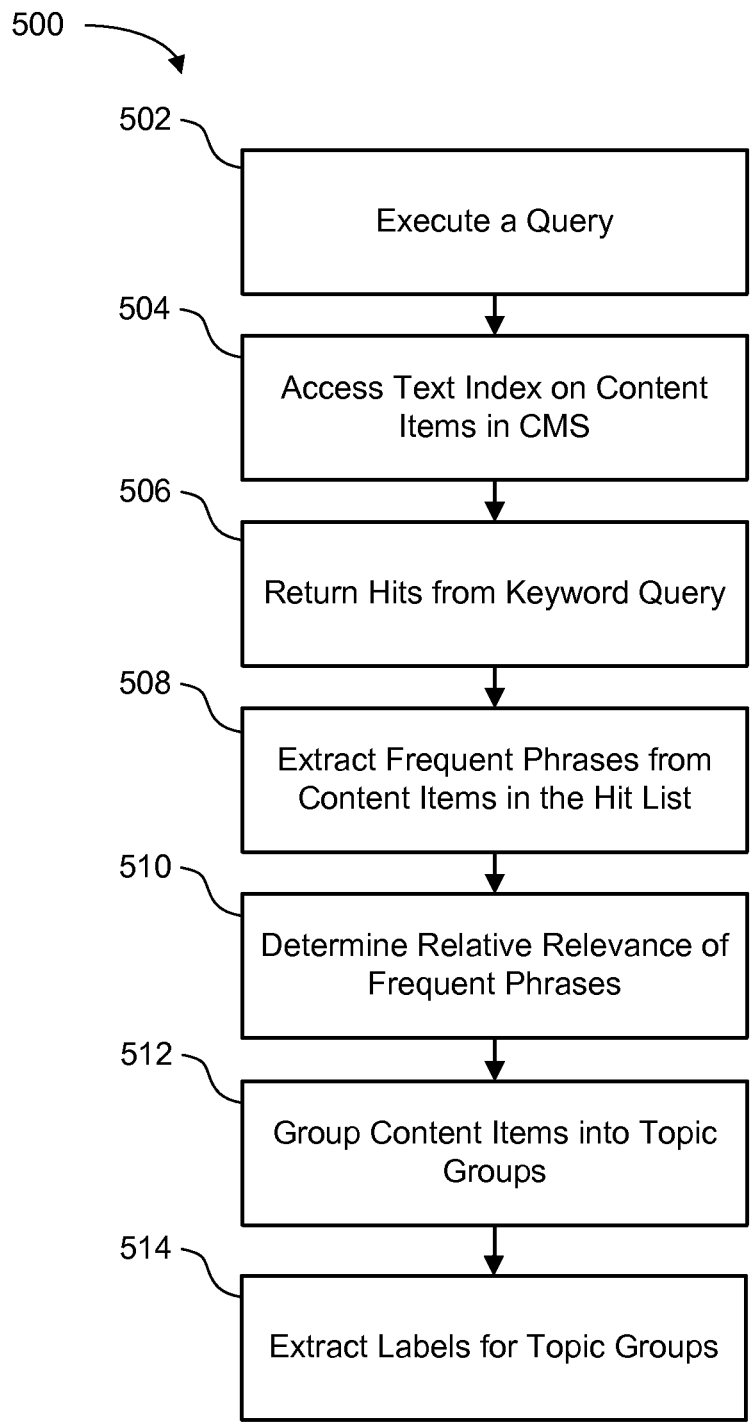
FIG. 5 is a flowchart diagram depicting one embodiment of a method for extracting frequent phrases from content items in a content store.

FIG. 5 is a flow chart diagram depicting one embodiment of a method 500 for extracting frequent phrases from content items in a content store. The method 500 includes executing 502 a query by accessing 504 the text index 110 on content items in a CMS 102. The text index 110 is probed with the keyword query, and the corresponding content items are returned 506 as "hits". A set of frequent phrases are extracted 508 from the content items in the hit list. Such phrases provide a foundation for extracting more elaborate dimensions. Frequent phrases are analyzed to determine 510 a relative relevance of the frequent phrases, with the phrases having the highest relative relevance being classified as "relevant phrases." Term/phrase synonymy and content item importance are combined to group 512 content items with similar text into topic groups and extract 514 representative labels for the topic groups.

In some embodiments of the method 500, the system 100 has only a few seconds to perform any extraction from potentially very large hit lists. Hence, the method 500 for discovering the core frequent phrase dimension must be extremely efficient.

In some embodiments, frequent phrases comprise up to a threshold number of words that occur frequently in the content items. There may also be a threshold $\tau$ defining the minimum number of content items that must contain a phrase for the phrase to be considered as a frequent phrase. For example, the frequent phrases may include two to five words that appear in more than $\tau = 5$ content items in the corpus are denoted as globally frequent phrases.

In one example CMS 102, globally frequent phrases are "data mining", "query optimization", "data integration", and so on. Intuitively, when authors write about something, they usually repeat the subject-related keywords to keep the attention of the readers. When the same phrases are repeated frequently in different content items, then it is a strong indication that the phrases describe an interesting subject in the entire corpus. Distinct content item-frequency is the frequency of a phrase. In other words, globally frequent phrases capture interesting information about the corpus and complement the single term information that is typically kept in the text index. The threshold $\tau$ is used in order to filter "noise" phrases that just happen to appear in a small number of content items.

The text index 110, in one embodiment, is "enriched" with posting lists for globally frequent phrases in a preprocessing step, using a sliding window over the content item content, in order to generate the phrases, and lossy counting to discover the phrases with frequency above $\tau$. These posting lists enable the efficient discovery of dynamic frequent phrases as described below.

In some embodiments, dynamic frequent phrases are the globally frequent phrases that appear frequently in the content items of the hit list. One way of discovering the top-k dynamic frequent phrases/terms is to intersect the hit list with each individual phrase/term posting list in the text index. The method 500 maintains a priority queue of the top-k most frequent phrases/terms in the process. When the posting lists have been processed, the queue contains the top-k most frequent phrases/terms for the query. Finally, the method 500 creates a multi-valued dimension for each content item in the hit list by associating it with the discovered frequent phrases that it contains.

Although the above idea is simple, it does not scale well to posting and hit lists with millions of content items. In order to minimize the processing required, some embodiments of the method deploy two novel pruning methods: early-out and approximate intersections.

In embodiments of the early-out method, posting lists are processed in descending order of their length. As the method progresses, and a posting list with a length less than the current minimum intersection size in the queue is found, then it is certain that the rest of the posting lists cannot make it into the queue, and processing is terminated.

The exact intersection of the full hit list H with a posting list P requires $O(|H|+|P|)$ comparisons. In embodiments of the approximate intersections method, accurate estimates for the intersection size are provided by performing a small and bounded number of comparisons. The technique provides performance improvements by orders of magnitude as hit and posting lists contain millions of content items. The approximate intersection method is described in greater detail below.

Method 1, shown below, is one embodiment of a method for discovering frequent phrases. In Method 1, given the hit list H for a keyword query, the sorted posting lists P for the phrases/terms from the text index 110 and the number k, the method efficiently finds the top-k frequent phrases/terms for the content items in the hit list.

---

Method 1: Dynamic Frequent Phrase Discovery (DFP)

---

1: P: Posting lists sorted by descending order of length
2: H: Hit list

| Method 1: Dynamic Frequent Phrase Discovery (DFP) |
| --- |
| 3: k: number of frequent phrases/terms |
| 4: |
| 5: queue: priority queue of <phrase,count> |
| 6: for i = 0 to \|P\| do |
| 7:   if \|P[i]\| < minimum count in queue then |
| 8:     break       // early-out |
| 9:   end if |
| 10:  count ← P[i] ∩ H    // approximate intersections |
| 11:  insert <P[i]$_{phrase}$, count> in queue |
| 12:  if queue contains more than k items then |
| 13:    pop entry with smallest count from queue |
| 14:  end if |
| 15: end for |
| 16: find the content item ids in H for each frequent phrase/term in queue |

Figure 6:
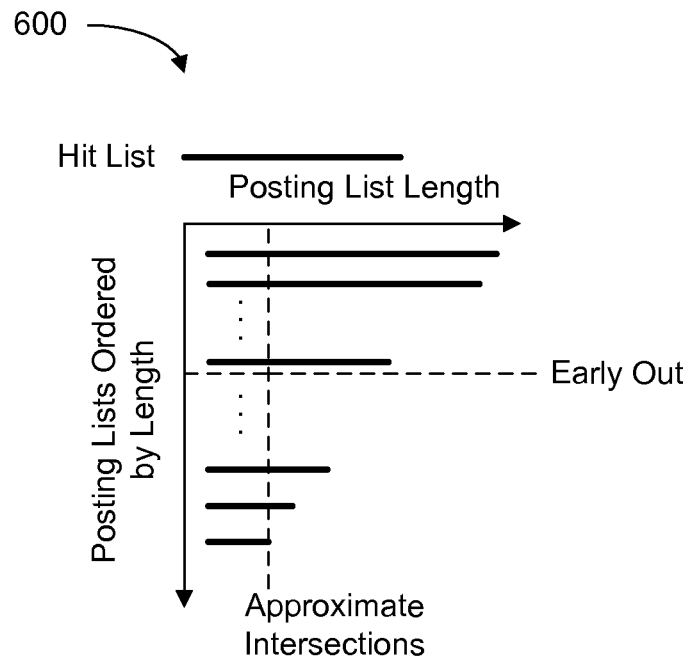
FIG. 6 depicts a schematic diagram of one embodiment of a method for pruning intersections between posting lists.

The effects of early-out and approximate intersections in an embodiment of Method 1 are depicted graphically in FIG. 6. Both methods complement each other. On the vertical dimension, early-out bounds the total number of posting list intersections that are performed, while on the horizontal dimension, approximate intersections limit the number of individual comparisons between the hit list and the current posting list. In line 10 of Method 1, intersection size is estimated. By estimating intersection size, a huge performance benefit is realized without sacrificing the quality of the returned top-k results.

In some embodiments of Method 1, the posting lists are "randomized" using Method 2, shown below, which hashes each content item id into a random number in the (0, 1) domain, and then sorts the hashed values in increasing order. Properties of the hashed values are exploited to estimate the union and intersection size very efficiently. Method 2 is applied to randomize the posting lists in the text index as a preprocessing step. At query time, Method 2 randomizes the hit list.

| Method 2: Posting List Randomization |
| --- |
| 1: L: Posting list to randomize |
| 2: h: hash function into (0, 1) domain |
| 3: |
| 4: for i = 0 to \|L\| do |
| 5:   L[i] ← h(L[i]) |
| 6: end for |
| 7: sort L in increasing order |

In certain embodiments, Method 3, shown below, is used to estimate the intersection size in line 10 in Method 1. The approximate intersection of Method 3 takes as input two randomized posting lists $P_1$, $P_2$, the maximum number M of comparisons and the maximum number I of common points. Method 3 returns an estimate of the intersection size $|P_1 \cap P_2|$.

| Method 3: Approximate Intersections |
| --- |
| 1:  $P_1$: first randomized posting list |
| 2:  $P_2$: second randomized posting list |
| 3:  M: maximum number of comparisons |
| 4: |
| 5:  nM ← 0; nI ← 0 |
| 6:  $c_1$ ← 0; $c_2$ ← 0 |
| 7:  $gap_1$ ← $P_1[|P_1| - 1] / |P_1|$; $gap_2$ ← $P_2[|P_2| - 1] / |P_2|$ |
| 8:  while $c_1 < |P_1|$ and $c_2 < |P_2|$ do |
| 9:     nM ← nM + 1 |
| 10:    if nM >= M then |
| 11:      break |
| 12:    end if |
| 13:    if $P_1[c_1] = P_2[c_2]$ then |
| 14:      $c_1$ ← $c_1$ + 1 |
| 15:      $c_2$ ← $c_2$ + 1 |
| 16:      nI ← nI + 1 |
| 17:      if nI >= I then |
| 18:        break |
| 19:      end if |
| 20:    else if $P_1[c_1] < P_2[c_2]$ then |
| 21:      $c_1'$ ← $c_1$ + ($P_2[c_2]$ - $P_1[c_1]$) / $gap_1$    // attempt uniform skipping |
| 22:      if $P_1[c_1'] <= P_2[c_2]$ then |
| 23:        $c_1$ ← $c_1'$        // successful skipping |
| 24:      else |
| 25:        $c_1$ ← $c_1$ + 1      // unsuccessful skipping |
| 26:      end if |
| 27:    else |
| 28:      $c_2'$ ← $c_2$ + ($P_1[c_1]$ - $P_2[c_2]$) / $gap_2$    // attempt uniform skipping |
| 29:      if $P_2[c_2'] <= P_1[c_1]$ then |
| 30:        $c_2$ ← $c_2'$        // successful skipping |
| 31:      else |
| 32:        $c_2$ ← $c_2$ + 1      // unsuccessful skipping |
| 33:      end if |
| 34:    end if |
| 35: end while |
| 36: if $c_1 = |P_1|$ or $c_2 = |P_2|$ then |
| 37:    apIntersect = nI |
| 38: else if nI > 0 then |

| Method 3: Approximate Intersections |
| --- |
| 39: $\quad$ apIntersect $= \left(\dfrac{nI}{c_2 + c_2 - nI}\right)\left(\dfrac{c_2 + c_2 - nI - 1}{\max\{P_2[c_2] \cdot P_2[c_2]\}}\right)$ |
| 40: $\quad$ else |
| 41: $\quad\quad$ apIntersect = 0 |
| 42: $\quad$ end if |
| 43: $\quad$ return apIntersec |

Figure 7:
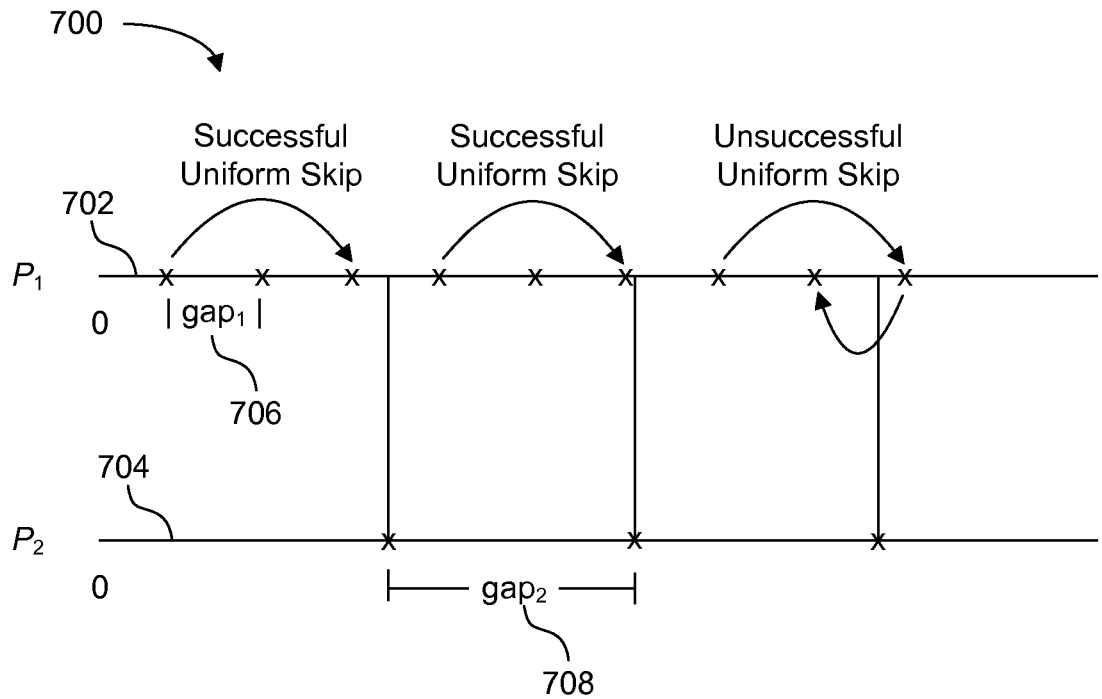
FIG. 7 depicts a schematic diagram of one embodiment of a method for approximating intersections between posting lists.

FIG. 7 depicts one embodiment of a method 700 for approximating intersections between posting lists $P_1$ 702 and $P_2$ 704 using Method 3. A "zipper" algorithm intersects the posting lists (lines 8-35 of Method 3). Initially the indexes $c_1$ and $c_2$ point to the beginning of the randomized posting lists. The values of $c_1$ and $c_2$ are compared, and the pointer that points to the smaller value is forwarded. The nl counter maintains the common points found while zipping the two posting lists together. This would be a classic zipper algorithm, but two optimizations are also included in Method 3: (1) the method 700 skips uniformly over the randomized posting lists (lines 21 and 28 of Method 3), and (2) the method 700 stops after M comparisons (line 10 of Method 3) or after finding I common points (line 18 of Method 3).

The intuition behind the two optimizations is that the hashed values in the randomized posting lists resemble closely uniform points in the (0, 1) domain. $Gap_1$ 706 (and $gap_2$ 708) are the average distance between two consecutive values in $P_1$ 702 (and $P_2$ 704, respectively). Notice that the expected distance between two consecutive points in $P_1$ 702 is $gap_1$ 706=$P_1[|P_1|-1]/|P_1|$ due to the uniformity of the points.

A classic zipper algorithm visits all the points in $P_1$ 702 and $P_2$ 704. In Method 3, however, the uniformity of the points is exploited by skipping in a principled way over comparisons that can never be true. As an example, consider the first comparison that the zipper algorithm performs between values $P_1[0]$ and $P_2[0]$ in FIG. 7. $P_2[0]$ is greater than $P_1[0]$ and therefore the index on the $P_1$ list must be increased. The distance $(P_2[0]-P_1[0])$ is used in embodiments of the method 700 as an indicator for the position where the corresponding point (if any) on $P_1$ 702 can be. More precisely, since the points resemble uniform random points, the method can uniformly skip $(P_2[0]-P_1[0])/gap_1$ points on $P_1$ 702. Similar skipping can occur on $P_2$ 704.

Since the hash function is not perfect and the hash values are not exactly equi-distributed in the (0, 1) domain, it is possible that the skipping may "overshoot". If overshooting happens, in one embodiment, the method 700 aborts the skip and increases the corresponding index by one. This case is handled in lines 22 and 29 in Method 3.

Uniform skipping is very effective when posting lists of very different sizes are intersected as wide skips happen over the large posting list. On the other hand, when posting lists of similar sizes are intersected, more frequent overshooting happens, which can effect in a negative way the performance of the method. Thus, in one embodiment, uniform skipping is disabled when the posting lists have about the same size.

FIG. 7 shows that in some embodiments the pattern of comparisons is normal and repetitive (due to the uniformity of the hashed values). Comparisons are avoided all the way to the end of the posting list, and the method stops in response to performing M comparisons in total or finding I common points. In some embodiments, M is chosen to be much smaller than $|P_1|+|P_2|$. M is actually independent of the actual posting list sizes (which could be many million points in practice) and the values of M and I provide a strict confidence interval. M bounds the absolute error, while I bounds the relative error. Method 3 maintains the full set and reduces the number of comparisons required to compute only the intersection size.

Since Method 3 does not perform all the comparisons (but at most M), the formula in line 39 of Method 3 estimates the actual intersection size based on only these observations. This formula is a tight estimator for the intersection. The intuition behind this assertion is that (a) the quantity $c_1+c_2-nI$ maintains the number of distinct points in the union of $P_1$ 702 and $P_2$ 704 that are seen at any given moment, and $$\left(\frac{c_1 + c_2 - nI - 1}{\max\{P_1[c_1] \cdot P_2[c_2]\}}\right)$$

is an estimator for $|P_1 \cup P_2|$ and (b) The quantity $$\left(\frac{nI}{c_1 + c_2 - nI}\right)$$

is an estimator of the Jaccard Distance $$J = \frac{|P_1 \cap P_2|}{|P_1 \cup P_2|}.$$

Multiplying the Jaccard Distance estimator with the union estimator results in the estimator for the intersection ($|P_1 \cap P_2|$).

With the early-out and the approximate intersection optimization, the method 700 can intersect huge posting lists by performing a very small number of comparisons. In one embodiment of the method 700, a simple linear hash function randomizes the posting lists.

Although dynamic frequent phrases describe the content of the hit list, in practice they still contain a large list of stopword combinations and uninteresting phrases. In order to remove such noise, embodiments of the frequent phrase extractor 206 determine relevant phrases and approximately weight the relevant phrases from the irrelevant phrases.

A relevant phrase, in one embodiment is a frequent phrase in the hit list that appears disproportionally more often in the hit list than it appears in the full corpus of the content items in the content store. For example, consider the query "Jim Gray". Phrases like Gray's email address, affiliation, address, "isolation level," and "transactional consistency" appear much more often in the hit list than in the full corpus and identify the content of hit list much better and concisely than the frequent phrases. On the other hand, phrases like "database performance" appear roughly equally often in the hit list as they do in the full corpus and is denoted an irrelevant phrase. Relevant phrases describe the hit list in a much more concise and exact way than frequent phrases do. Irrelevant phrases on the other hand offer almost no hit list specific information, since they cannot discriminate among the hit list and the full corpus.

Method 4, shown below, summarizes one embodiment of the process of discovering relevant phrases/terms for each content item in the hit list.

| Method 4: Dynamic Relevant Phrases/Terms |
| --- |
| 1: Freq: Dynamic Frequent Phrases/Terms from Method 1 |
| 2: H: Hit list |
| 3: nDocs: total number of content items in the corpus |
| 4: l: number of relevant phrases/terms |
| 5: |
| 6: queue: priority queue of (phrase, relevance) |
| 7: for each phrase in Freq do |
| 8: $phrase_f \leftarrow$ frequency of phrase in Freq |
| 9: $phrase_{post} \leftarrow$ posting list length of phrase |
| 10: $$relevance \leftarrow \frac{\log(phrase_f)(\log(|H|) + 1)}{(\log(phrase_{post}) + 1)\log(nDocs)}$$ |
| 11: insert(phrase, relevance) in queue |
| 12: if queue has more than l items then |
| 13: pop item from queue with the smallest relevance |
| 14: end if |
| 15: end for |
| 16: find the content item ids in H for each relevant phrase/term in queue |

The input of Method 4 is the top-k frequent phrases previously discovered, the size |H| of the hit list, the total number nDocs in our corpus and the number l (<k) of most relevant phrases that to compute. The method processes the dynamic frequent phrases discovered with Method 1 and computes a relevance score using the formula in line 10. This formula boosts phrases/terms that are infrequent in the full corpus but frequent in the hit list. Method 4 is very efficient since it only has to process the top-k (for example, a few thousand) frequent phrases, and is independent of the size of the corpus.

Once the top-l relevant phrases have been discovered, another multi-valued dimension is created by associating each document in the hit list with all the discovered relevant phrases that it contains (line 16 of Method 4).

The list of relevant phrases, in one embodiment, is further filtered and enhanced by (a) taking content item importance into account and (b) analyzing the occurrences of relevant phrases in the important content items. Content item ranking helps separate the really important content items from noise content items. An effective way of statically ranking content items that have link information is a link analysis algorithm. Similarly for dynamically selected content items another algorithm for ranking is an object ranking algorithm. Such algorithms essentially compute a measure of "centrality" of a content item, i.e., how easy it is to reach that content item by following a small number of links from other content items. For example, in a content store 108 containing academic papers, ranking based on citations returns the most cited (seminal) papers.

In one embodiment, such measures (link analysis and object analysis) are incorporated directly as OLAPmeasures (called "importance"), in order to compute interesting aggregations. Additionally the most important papers are used, in one embodiment, to further filter the relevant phrases.

A modified Latent Semantic Indexing (LSI) technique is used in some embodiments. LSI is a technique in natural language processing for analyzing relationships between a set of content items and the terms that they contain by producing a set of topics related to the content items and terms. LSI uses a sparse term-content item matrix, which describes the occurrences of terms in content items. In one embodiment, a typical TF•IDF score is used for weighting elements of the matrix.

A relevant phrase-content item matrix is constructed using the relevant phrases discovered using Method 4, in one embodiment. A full relevant phrase-content item matrix however, may be too large for typical computing resources and interactive navigation requirements. Consequently, in one embodiment, only the top-l (for example, the top 100) relevant phrases and the top-m (for example, the top 400) ranked content items are taken into account while constructing the (sparse) occurrence matrix. After the construction of the occurrence matrix, in one embodiment, the method finds a low-rank approximation to the relevant phrase-content item matrix using Singular Value Decomposition (SVD) in the spirit of LSI.

In some embodiments, the most important eigenvalues of the SVD, which conceptually return an approximate occurrence matrix for the most important topics in the ranked hit list, are used. For example, the top fifteen eigenvalues of the SVD may be used. Each topic is associated with both content items and relevant phrases/terms. For each such topic, the relevant phrase with the biggest cosine similarity with the content items in that concept is picked as a representative topic description.

Once the representative topic descriptions have been discovered, in some embodiments another multi-valued dimension is created by associating each content item in the hit list with all the topic descriptions that the content items contain.

In certain embodiments, discovered dimensions are hierarchical. Methods and algorithms similar or identical to those described above to create single-level (flat) dimensions are used to create hierarchical dimensions. Lower levels in the hierarchy for each one level already computed are created until the levels correspond to a small number of content items (for example, fifteen content items). For example, consider the content items corresponding to the topic with description "Schema Mapping", which are discovered given the keyword query "xml". The previously introduced methods and algorithms are applied to discover frequent phrases, relevant phrases, and topics for the content items in this concept, and sub-levels are created for "Schema Mapping".

Although the same or similar methods and algorithms are applied for all discovered topics, in some embodiments, those levels are not computed immediately for performance reasons. For example, as a user "drills down," population of the appropriate dynamic dimensions is triggered.

It should also be noted that at least some of the operations for the methods may be implemented using software instructions stored on a computer useable storage medium for execution by a computer. As an example, an embodiment of a computer program product for finding top-k sets in a collection of static sets P, wherein the top-k sets have maximal overlap with an input dynamic set H includes a computer useable storage medium to store a computer readable program that, when executed on a computer, causes the computer to perform operations, including randomizing items L in each static set P[i] in a collection of static sets P, randomizing an input dynamic set H, estimating an intersection size of an intersection of the static set P[i] and the input dynamic set H for each static set P[i], and maintaining a priority queue of top-k static sets having largest intersection sizes. Items L are randomized during a preprocessing state independent of the input dynamic set H. Randomizing items L and input dynamic set H uses a technique including hashing each item L[i] into a random number in a [0,1] domain to obtain hashed values and sorting the hashed values in increasing order. Dynamic set H is randomized at query time.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for accessing content items in a content store comprising:
   maintaining a text index of content items in a content store to enable a keyword search on the content items;
   receiving a query having a keyword and generating a hit list from the text index using the keyword, the hit list comprising two or more content items of the content store;
   extracting frequent phrases from text within content items of the hit list by estimating an intersection size, wherein the estimating comprises executing an algorithm to intersect a first posting list generated from globally frequent phrases with a second posting list generated from the hit list, wherein the algorithm terminates the executing in response to the earlier of identifying a predetermined M maximum number of comparisons or a predetermined I maximum number of common points;
   assigning a relative relevance to the frequent phrases wherein frequent phrases having a relatively high relevance are relevant phrases; and
   grouping content items into topics based on presence of relevant phrases within the content items of the hit list.

2. The computer-implemented method of claim 1, further comprising ranking content items of the hit list by importance.

3. The computer-implemented method of claim 2 wherein importance is based on associations with other content items in the content store.

4. The computer-implemented method of claim 3, wherein the associations are citations to one or more different content items.

5. The computer-implemented method of claim 2 wherein grouping content items into topics is further based on importance.

6. The computer-implemented method of claim 1, further comprising:
   maintaining a content model for metadata of the content items, wherein the metadata includes links between two or more content items;
   using metadata of the content items in the hit list to populate static dimensions of a multidimensional schema;
   analyzing content items of the hit list to determine dynamic dimensions; and
   providing, based on multidimensional schema, OLAP-style analysis of the content items of the hit list, including at least one analysis selected from the group consisting of aggregation, navigation and reporting.

7. The computer-implemented method of claim 1, further comprising:
   preprocessing the content items to enrich the text index, wherein the preprocessing comprises generating a list of globally frequent phrases, wherein the globally frequent phrases are phrases that consist of at least two words that appear in more than a first threshold number of different content items in the content store; and
   adding the globally frequent phrases to the text index.

8. The computer-implemented method of claim 1, further comprising:
   maintaining a priority queue of the top-k most frequent phrases while intersecting the hit list with globally frequent phrases in descending order based upon length of the globally frequent phrases;
   terminating the intersecting in response to identifying a globally frequent phrase with a length less than a current minimum intersection size in the priority queue; and
   identifying phrases in the queue as the top-k dynamically frequent phrases.

9. The computer-implemented method of claim 1, further comprising:
   maintaining a priority queue of the top-k most frequent phrases while intersecting the hit list with the globally frequent phrases, wherein the estimating comprises:

randomizing the globally frequent phrases in the text index to produce the first randomized posting list; and randomizing the hit list to produce the second randomized posting list, wherein the algorithm is a modified zipper algorithm.

10. The computer-implemented method of claim 9, wherein the estimating further comprises multiplying a Jaccard Distance estimator with a union estimator to produce an estimate for the intersection of the first randomized posting list and the second randomized posting list.

11. The computer-implemented method of claim 1, further comprising extracting labels for topics based on relevant phrases within the content items of the hit list.

12. The computer-implemented method of claim 1, further comprising:

receiving an input selecting a topic;

extracting frequent phrases from text within content items of the topic;

assigning a relative relevance to the frequent phrases wherein frequent phrases having a relatively high relevance are relevant phrases;

grouping content items into subtopics based on presence of relevant phrases within the content items of the topic.

13. A system comprising:

a content management system (CMS) comprising:

a plurality of content items;

a content store to store content items;

a text index of text within the content items; and an exploration server coupled to the content store and the text index and configured to:

generate a hit list from the text index using the keyword, the hit list comprising two or more content items of the content store;

extract frequent phrases from text within content items of the hit list by estimating an intersection size, wherein the estimating comprises executing an algorithm to intersect a first posting list generated from globally frequent phrases with a second posting list generated from the hit list, wherein the algorithm terminates the executing in response to the earlier of identifying a predetermined M maximum number of comparisons or a predetermined I maximum number of common points;

assign a relative relevance to the frequent phrases wherein frequent phrases having a relatively high relevance are relevant phrases; and group content items into topics based on presence of relevant phrases within the content items of the hit list; and a multidimensional schema manager to manage a multidimensional schema comprising a schema of a fact table and schemata of static dimensions, wherein dynamic dimensions of the multidimensional schema are populated in response to the exploration server returning the hit list, and wherein dynamic dimensions of the multidimensional schema are identified in response to the exploration server returning the hit list based upon content dynamically extracted from the subset of content items identified in the hit list.

* * * * *